(12) United States Patent
Knott et al.

(10) Patent No.: US 11,859,053 B2
(45) Date of Patent: *Jan. 2, 2024

(54) SIOC-BONDED, LINEAR POLYDIMETHYLSILOXANE-POLYOXYALKYLENE BLOCK COPOLYMERS

(71) Applicant: Evonik Operations GmbH, Essen (DE)

(72) Inventors: Wilfried Knott, Essen (DE); Dagmar Windbiel, Essen (DE); Horst Dudzik, Essen (DE)

(73) Assignee: Evonik Operations GmbH, Essen (DE)

( * ) Notice: Subject to any disclaimer, the term of this patent is extended or adjusted under 35 U.S.C. 154(b) by 336 days.

This patent is subject to a terminal disclaimer.

(21) Appl. No.: 17/145,558

(22) Filed: Jan. 11, 2021

(65) Prior Publication Data

US 2021/0253799 A1  Aug. 19, 2021

(30) Foreign Application Priority Data

Feb. 14, 2020 (EP) .................................... 20157315

(51) Int. Cl.
*C08G 77/08* (2006.01)
*C08G 77/14* (2006.01)
*C08G 101/00* (2006.01)
*C08G 77/06* (2006.01)

(52) U.S. Cl.
CPC ............ *C08G 77/14* (2013.01); *C08G 77/06* (2013.01); *C08G 77/08* (2013.01); *C08G 2101/00* (2013.01)

(58) Field of Classification Search
CPC ........ C08G 77/45; C08G 77/46; C08G 77/06; C08G 77/08
See application file for complete search history.

(56) References Cited

U.S. PATENT DOCUMENTS

| | | | |
|---|---|---|---|
| 3,356,758 A * | 12/1967 | Omietanski ............ | C08G 77/46 528/29 |
| 3,384,599 A * | 5/1968 | Omietanski ............ | C08G 18/61 521/154 |
| 3,836,560 A | 9/1974 | Prokai et al. | |
| 4,497,962 A * | 2/1985 | de Montigny ......... | C08J 9/0061 556/457 |
| 4,562,223 A * | 12/1985 | Steinberger ............ | C08G 77/46 524/506 |
| 7,196,153 B2 | 3/2007 | Burkhart et al. | |
| 7,598,334 B2 | 10/2009 | Ferenz et al. | |
| 7,612,158 B2 | 11/2009 | Burkhart et al. | |
| 7,619,035 B2 | 11/2009 | Henning et al. | |
| 7,645,848 B2 | 1/2010 | Knott et al. | |
| 7,825,205 B2 | 11/2010 | Knott et al. | |
| 7,825,206 B2 | 11/2010 | Neumann et al. | |
| 7,825,209 B2 | 11/2010 | Knott et al. | |
| 8,138,294 B2 | 3/2012 | Henning et al. | |
| 8,283,422 B2 | 10/2012 | Schubert et al. | |
| 8,309,664 B2 | 11/2012 | Knott et al. | |
| 8,334,355 B2 | 12/2012 | Henning et al. | |
| 8,420,748 B2 | 4/2013 | Henning et al. | |
| 8,598,295 B2 | 12/2013 | Henning et al. | |
| 8,623,984 B2 | 1/2014 | Henning et al. | |
| 8,779,079 B2 | 7/2014 | Henning et al. | |
| 9,068,044 B2 | 6/2015 | Schubert et al. | |
| 10,399,998 B2 | 9/2019 | Knott et al. | |
| 10,414,871 B2 | 9/2019 | Knott et al. | |
| 10,414,872 B2 * | 9/2019 | Knott ..................... | C08G 77/46 |
| 10,519,280 B2 | 12/2019 | Knott et al. | |
| 10,526,454 B2 | 1/2020 | Knott et al. | |
| 10,752,735 B2 | 8/2020 | Knott et al. | |
| 10,766,913 B2 | 9/2020 | Knott et al. | |
| 10,954,344 B2 * | 3/2021 | Knott ..................... | C08G 77/46 |
| 11,021,575 B2 | 6/2021 | Knott et al. | |
| 11,066,429 B2 | 7/2021 | Knott et al. | |
| 11,261,298 B2 * | 3/2022 | Favresse ................ | C08G 77/46 |
| 11,286,351 B2 * | 3/2022 | Knott ..................... | C08G 77/38 |
| 11,472,822 B2 * | 10/2022 | Knott ..................... | C08G 77/70 |
| 2008/0153992 A1 | 6/2008 | Knott et al. | |
| 2008/0153995 A1 * | 6/2008 | Knott ..................... | C08G 77/46 525/474 |

(Continued)

FOREIGN PATENT DOCUMENTS

CA  3099860 A1  11/2019
CA  3099861 A1  11/2019

(Continued)

OTHER PUBLICATIONS

Pola et al., "Mechanism of Reversible Cleavage of Acetoxysilanes to Siloxanes and Acetanhydride", Collection Czechoslov. Chem. Commun., vol. 39, 1974, pp. 1169-1176.
W. Simmler, Houben-Weyl, Methods of Organic Chemistry, vol. VI/2, 4th Edition, O-Metal Derivates of Organic Hydroxy Compounds, 1963, pp. 77-170, with partial English translation of pp. 162-164.
European Patent Search Report dated Aug. 26, 2020 in EP 20157315.1 (6 pages).
Knott et al., U.S. Appl. No. 17/239,011, filed Apr. 23, 2021.
Knott et al., U.S. Appl. No. 17/476,417, filed Sep. 15, 2021.

(Continued)

*Primary Examiner* — Margaret G Moore

(74) *Attorney, Agent, or Firm* — Grüneberg and Myers PLLC

(57) ABSTRACT

Process for producing SiOC-bonded, linear polydimethylsiloxane-polyoxyalkylene block copolymers comprising repeating (AB) units, comprising pretreating acidified, end-equilibrated α,ω-diacetoxypolydimethylsiloxanes with a base and reacting the α,ω-diacetoxypolydimethylsiloxanes resulting therefrom with polyether diols in the presence of a solid, liquid or gaseous base, optionally using inert solvents.

18 Claims, No Drawings

(56) References Cited

U.S. PATENT DOCUMENTS

| | | |
|---|---|---|
| 2010/0022435 A1 | 1/2010 | Henning et al. |
| 2011/0301254 A1 | 12/2011 | Knott et al. |
| 2013/0041115 A1 | 2/2013 | Knott et al. |
| 2014/0256844 A1 | 9/2014 | Henning et al. |
| 2020/0055992 A1 | 2/2020 | Knott et al. |
| 2020/0339612 A1 | 10/2020 | Knott et al. |
| 2020/0377524 A1 | 12/2020 | Knott et al. |
| 2020/0377525 A1 | 12/2020 | Knott et al. |
| 2020/0377640 A1 | 12/2020 | Knott et al. |
| 2020/0377660 A1 | 12/2020 | Knott et al. |
| 2020/0377663 A1 | 12/2020 | Favresse et al. |
| 2020/0377665 A1 | 12/2020 | Knott et al. |
| 2020/0377666 A1 | 12/2020 | Knott et al. |
| 2020/0377667 A1 | 12/2020 | Favresse et al. |
| 2020/0377669 A1 | 12/2020 | Knott et al. |
| 2020/0377684 A1 | 12/2020 | Hermann et al. |
| 2020/0377686 A1 | 12/2020 | Knott et al. |
| 2021/0130551 A1 | 5/2021 | Knott et al. |
| 2021/0163687 A1 | 6/2021 | Knott et al. |
| 2021/0171719 A1 | 6/2021 | Knott et al. |
| 2021/0253780 A1 | 8/2021 | Wessely et al. |
| 2021/0301099 A1 | 9/2021 | Knott et al. |

FOREIGN PATENT DOCUMENTS

| | | |
|---|---|---|
| DE | 20 2010 017 915 U1 | 3/2013 |
| EP | 1 935 923 A2 | 6/2008 |
| EP | 1935922 B1 | 5/2013 |
| EP | 3611214 A1 | 2/2020 |
| EP | 3611216 A1 | 2/2020 |
| EP | 3611217 A1 | 2/2020 |

OTHER PUBLICATIONS

Knott et al., U.S. Appl. No. 17/297,372, filed May 26, 2021.
Chinese Office Action dated Jul. 1, 2023, in Chinese Application No. 202110177261.0, 6 pages.

* cited by examiner

SIOC-BONDED, LINEAR POLYDIMETHYLSILOXANE-POLYOXYALKYLENE BLOCK COPOLYMERS

CROSS REFERENCE TO RELATED APPLICATIONS

This application is a 35 U.S.C. § 119 patent application which claims the benefit of European Application No. 20157315.1 filed Feb. 14, 2020, which is incorporated herein by reference in its entirety.

FIELD

The invention relates to a process for producing SiOC-bonded, linear polydimethylsiloxane-polyoxyalkylene block copolymers comprising repeating (AB) units.

BACKGROUND

In the production of flexible polyurethane foams the mixture of raw materials may be admixed with polysiloxane-polyoxyalkylene block copolymers which have a very wide variety of uses and inter alia allow formation of a uniform pore structure and stabilize the resulting foam until termination of the reaction. However not all polysiloxane-polyoxyalkylene block copolymers are similarly suitable. In order to be usable as polyurethane foam stabilizers the polyoxyalkylene blocks and the polysiloxane block of the block copolymers must be present in a balanced ratio, the construction of the two blocks also being very important.

EP1935922 B1 teaches a route to high molecular weight linear SiOC-bonded polydimethylsiloxane-polyoxyalkylene block copolymers comprising repeating (AB) units by reaction of polyether diols with a stoichiometric excess of $\alpha,\omega$-dihydrogenpolydimethylsiloxanes in the presence of one or more element compounds of main group III and/or the 3rd transition group as catalyst, wherein after complete conversion of the alcohol component the reaction is continued until $\equiv$Si(H) groups are no longer detectable by gas volumetric means. The gas volumetric SiH value determination is effected by alkoxide-induced decomposition of a sample according to established processes.

Irrespective of the attractiveness of this dehydrogenative process for SiOC bonding especially in relation to the avoidance of liquid and/or solid byproducts, both the use of costly and toxic catalysts such as for example tris(pentafluorophenyl)borane and the safe handling and disposal of the hydrogen gas formed in the synthesis represent disadvantages of this technology that need to be overcome.

Against this very general background, unpublished European patent application having filing number 18189072.4 describes a simple, economically advantageous process by which SiOC-bonded linear polydimethylsiloxane-polyoxyalkylene block copolymers having improved properties may be produced. In the abovementioned document it was found that linear SiOC-bonded polydimethylsiloxane-polyoxyalkylene block copolymers comprising repeating (AB) units and very particularly also those of high molecular weight are producible by reacting end-equilibrated linear, trifluoromethanesulfonic acid-acidified $\alpha,\omega$-acetoxy-bearing polydimethylsiloxanes with polyether diols, wherein this reaction is undertaken by adding a solid, liquid or gaseous base, optionally using inert solvents.

In the context of the present invention it has now been found that compared to the teaching of the unpublished European patent application having filing number 18189072.4 the molar mass increase may surprisingly be yet further improved, namely through the use of appropriately pretreated $\alpha,\omega$-diacetoxypolydimethylsiloxanes.

SUMMARY

The specific technical problem to be solved by the present invention is accordingly that of providing a process for producing linear SiOC-bonded polydimethylsiloxane-polyoxyalkylene block copolymers, and very particularly also those of high molecular weight, which likewise overcomes the difficulties of the known prior art, for example EP1935922 B1 and U.S. Pat. No. 3,836,560, as discussed in unpublished European patent application having filing number 18189072.4.

This problem is solved by the subject-matter of the invention.

DETAILED DESCRIPTION

The invention provides a process for producing SiOC-bonded, linear polydimethylsiloxane-polyoxyalkylene block copolymers comprising repeating (AB) units, comprising the steps of:
  (a) pretreating acidified, preferably superacid-acidified, preferably trifluoromethanesulfonic acid-acidified, end-equilibrated $\alpha,\omega$-diacetoxypolydimethylsiloxanes with a base with optional subsequent distillative purification of the $\alpha,\omega$-diacetoxypolydimethylsiloxanes previously pretreated with base
  (b) reacting the $\alpha,\omega$-diacetoxypolydimethylsiloxanes resulting from (a) with polyether diols in the presence of a solid, liquid or gaseous base, optionally using inert solvents.

The invention further provides SiOC-bonded, linear polydimethylsiloxane-polyoxyalkylene block copolymers comprising repeating (AB) units produced by the process according to the invention and to the use thereof as surface-active additives for production of polyurethane ether foams.

The process according to the invention will initially be precisely elucidated.

The process according to the invention provides for pretreating acidified, preferably superacid-acidified, preferably trifluoromethanesulfonic acid-acidified, end-equilibrated $\alpha,\omega$-diacetoxypolydimethylsiloxanes with a base with optional subsequent distillative purification of the $\alpha,\omega$-diacetoxypolydimethylsiloxanes previously pretreated with base.

The acidified, preferably superacid-acidified, especially trifluoromethanesulfonic acid-acidified, end-equilibrated $\alpha,\omega$-diacetoxypolydimethylsiloxanes to be employed are obtainable for example by reacting cyclic siloxanes, in particular comprising $D_4$ and/or $D_5$, with acetic anhydride using acid, preferably superacid, in particular trifluoromethanesulfonic acid, as catalyst. The acid, preferably superacid, especially trifluoromethanesulfonic acid is preferably employed in amounts of 0.1 to 0.3 percent by mass based on the reaction matrix consisting of acetic anhydride and cyclic siloxanes. The employed acids are preferably superacids. Superacids are well known to those skilled in the art; these are generally acids which are stronger than concentrated 100% sulfuric acid ($H_2SO_4$: $pK_a=-3.0$). Acid strength is generally quantified using the Hammett acidity function. Particular preference is given to superacids having a pKa of less than −3.0, preferably fluorinated and/or perfluorinated sulfonic acids, fluorosulfonic acid $HSO_3F$, fluoroantimonic acid HSbF$_6$, perfluorobutanesulfonic acid C$_4$F$_9$SO$_3$H and very particularly preferably trifluoromethanesulfonic acid CF$_3$SO$_3$H. The reaction is preferably performed at temperatures of 140° C. to 160° C. and preferably over a period of 4 to 8 hours. Particularly suitable trifluoromethanesulfonic acid-acidified, equilibrated α,ω-diacetoxysiloxanes and the production thereof are described for example in EP18189075.7 and EP18189074.0.

The pretreatment of the acidified, preferably superacid-acidified, preferably trifluoromethanesulfonic acid-acidified, end-equilibrated α,ω-diacetoxypolydimethylsiloxanes may in principle be carried out with any base. Preferred simple bases to be employed according to the invention are for example alkali metal and/or alkaline earth metal carbonates and/or hydrogencarbonates and/or gaseous ammonia and/or amines. Taking account of the known tendency to condensation of acetoxysiloxanes, very particular preference is given to those bases which on account of their chemical composition do not introduce any water into the reaction system. Thus anhydrous carbonates are preferred over hydrogencarbonates and bases free from water of hydration are preferred over bases containing water of hydration. However, the use of gaseous ammonia as the base is very particularly preferred according to the invention. This corresponds to a very particularly preferred embodiment.

In a particularly preferred embodiment the pretreatment of the acidified end-equilibrated α,ω-diacetoxypolydimethylsiloxane in step (a) is performed with base, in particular ammonia, in the temperature range from 0° C. to 50° C., preferably between 15° C. to 35° C. The minimum molar amount of the employed base, in particular ammonia, is preferably chosen such that it corresponds to 1/20 to 1/8 of the molar amount of Si-bonded acetoxy groups in the α,ω-diacetoxypolydimethylsiloxane. This base treatment further ensures that the acid, especially trifluoromethanesulfonic acid, present in the system is neutralized.

The pretreatment of the acidified, preferably superacid-acidified, especially trifluoromethanesulfonic acid-acidified, end-equilibrated α,ω-diacetoxypolydimethylsiloxanes with a base may be followed by a purification. For example any solids may be removed, for example by filtration. A distillative purification of the previously base-treated α,ω-diacetoxypolydimethylsiloxane may in particular be carried out if desired.

Especially the inventive pretreatment of the acidified, preferably superacid-acidified, especially trifluoromethanesulfonic acid-acidified, end-equilibrated α,ω-diacetoxypolydimethylsiloxanes with a base distinguishes the present subject-matter from the subject-matter of the unpublished European patent application having filing number 18189072.4. This inventive pretreatment especially provides a further contribution to the desired achievement of a high molecular weight SiOC-bonded A(BA)n-polyethersiloxane structure.

The process according to the invention comprises reacting the α,ω-diacetoxypolydimethylsiloxanes resulting from (a) with polyether diols in the presence of a solid, liquid or gaseous base, optionally using inert solvents.

Preferred bases to be employed according to the invention in step (b) correspond to the abovementioned bases, cf. step (a). The use of gaseous ammonia as the base is likewise very particularly preferred according to the invention. In a preferred embodiment of the invention the amount of the solid, liquid or gaseous base introduced into the reaction system in step (b) is chosen such that it is at least stoichiometric based on the Si-bonded acetoxy groups present in the acetoxysiloxane treated according to the invention, particularly preferably superstoichiometric based on said groups.

In a preferred embodiment of the invention the reaction is performed in step (b) at temperatures between 20° C. to 120° C., preferably between 20° C. and 70° C., over the duration of 1 to 10, preferably at least over the duration of 1 to 3, hours.

As is already known from the unpublished European patent application having filing number 18189072.4, the quality of the employed acidified, preferably superacid-acidified, especially trifluoromethanesulfonic acid-acidified α,ω-diacetoxypolydimethylsiloxane is also of decisive importance for the achievement of a high molecular weight SiOC-bonded A(BA)n-polyethersiloxane structure.

According to the unpublished European patent application having filing number 18189072.4 it is desirable to achieve a perfect equilibration result for the employed acidified, preferably superacid-acidified, especially trifluoromethanesulfonic acid-acidified α,ω-diacetoxypolydimethylsiloxane for the construction of high molecular weight SiOC-bonded A(BA)n-polyethersiloxane structures. The term "end-equilibrated" is accordingly to be understood as meaning that the equilibrium established at a temperature of 23° C. and a pressure of 1013.25 hPa has been reached. Employed as an indicator for reaching the abovementioned equilibrium is the total cycles content determined by gas chromatography and defined as the sum of the D$_4$, D$_5$, D$_6$ contents based on the siloxane matrix and ascertained after derivatization of the α,ω-diacetoxypolydimethylsiloxanes to the corresponding α,ω-diisopropoxypolydimethylsiloxanes. The derivatization to afford the α,ω-diisopropoxypolydimethylsiloxanes is intentionally chosen in order to prevent a thermally induced retrocleavage reaction of the α,ω-diacetoxypolydimethylsiloxanes which may take place under the conditions of analysis by gas chromatography (regarding the retrocleavage reaction see inter alia J. Pola et al., Collect. Czech. Chem. Commun. 1974, 39(5), 1169-1176 and also W. Simmler, Houben-Weyl, Methods of Organic Chemistry, Vol. VI/2, 4$^{th}$ Edition, 0-Metal Derivates of Organic Hydroxy Compounds p. 162 ff). According to the invention the total cycles content present therein defined as the sum of the content fractions of the cyclic siloxanes comprising D$_4$, D$_5$ and D$_6$ based on the siloxane matrix shall preferably be less than 13 percent by weight, particularly preferably less than 12 percent by weight, based on the siloxane matrix consisting of α,ω-diisopropoxypolydimethylsiloxanes.

Equilibrated α,ω-diacetoxypolydimethylsiloxanes of this quality, i.e. end-equilibrated α,ω-diacetoxypolydimethylsiloxanes, may be produced very advantageously, i.e. even after a very short reaction time, by reaction of siloxane cycles (particularly comprising D$_4$ and/or D$_5$) with acetic anhydride in the presence of trifluoromethanesulfonic acid and acetic acid. It is preferable when acetic acid is added in amounts of 0.4 to 3.5 percent by weight, preferably 0.5 to 3 percent by weight, more preferably 0.8 to 1.8 percent by weight, particularly preferably in amounts of 1.0 to 1.5 percent by weight, based on the reaction matrix consisting of acetic anhydride and cyclic siloxanes. The provision of trifluoromethanesulfonic acid-acidified, end-equilibrated α,ω-diacetoxypolydimethylsiloxanes employable according to the invention is described for example in Example 1 of unpublished European patent application having filing number 18189072.4.

In the context of the present invention the inventors have found that a pretreatment of the acidified, preferably superacid-acidified, preferably trifluoromethanesulfonic acid-acidified, end-equilibrated α,ω-diacetoxypolydimethylsiloxanes with a base before the subsequent conversion with polyether diols results in particularly good product mixtures, especially in respect of the achievable degree of polymerization.

Since the degree of polymerization of the linear polydimethylsiloxane-polyoxyalkylene block copolymers is quality-determining, in particular for its effectiveness as a surfactant in polyurethane ether foams, reaction monitoring plays an important role. What has proven useful in this regard according to the invention is the method of withdrawing over the course of the reaction time samples of the reaction matrix which are then analyzed for example using $^{29}$Si-NMR and/or $^{13}$C-NMR spectroscopy. The reduction in the integral of the signals characteristic of the presence of acetoxydimethylsiloxy groups —OSi(CH$_3$)$_2$OCOCH$_3$ accompanies the intended molar mass increase of the copolymer having an A(BA)n structure and is a reliable indicator of the reaction conversion achieved.

Obtained in this way in a manner unforeseeable to those skilled in the art are structures which as stabilizers in the production of polyurethane foams (PU foams), in particular flexible PU foams, exhibit markedly better properties.

The present invention accordingly provides a process for producing SiOC-bonded, linear polydimethylsiloxane-polyoxyalkylene block copolymers comprising repeating (AB) units by reaction of polyether diols with inventively pretreated α,ω-diacetoxypolydimethylsiloxanes, wherein the reaction is undertaken by adding a solid, liquid or gaseous base, optionally using inert solvents.

Inert solvents employed in a preferred embodiment of the invention are alkanes, cycloalkanes, alkylaromatics, endcapped polyethers and/or emollient esters, such as the esters derived from lauric acid, myristic acid, palmitic acid, stearic acid, oleic acid, isostearic acid, ricinoleic acid and behenic acid combined with cetyl, stearyl, isostearyl, oleyl, octyldodecyl, myristyl and behenyl alcohol and/or glycerol, preferably myristyl myristate.

In a preferred embodiment of the invention the siloxane blocks (A) of the block copolymers that result according to the invention are linear siloxane polymers or chains comprising repeating siloxane units which may be represented by the formula (—R$_2$SiO—), wherein R=methyl.

In a preferred embodiment of the invention the polyoxyalkylene block (B) of the linear block copolymers that result according to the invention is an oxyalkylene polymer containing the repeating oxyalkylene units, here in particular the oxyethylene and propenyloxy units.

In a preferred embodiment the weight-average molecular weight of each siloxane block (A) is between 650 to 6500 g/mol, preferably 800 to 1500 g/mol, particularly preferably 1000 to 1200 g/mol.

In a preferred embodiment the weight-average molecular weight of each polyoxyalkylene block of the copolymers produced according to the invention is between 600 and 10,000 g/mol, preferably 1000 to 5000 g/mol.

The size of the individual oxyalkylene units or siloxane blocks is not necessarily uniform but may be varied as desired within the specified limits.

In a preferred embodiment of the invention the individual polyoxyalkylene units are addition products of at least one oxyalkylene monomer selected from the group of ethylene oxide, propylene oxide, butylene oxide, tetrahydrofuran, preferably mixed products composed of at least two monomer units, in particular of ethylene oxide and propylene oxide.

In a preferred embodiment the polyoxyalkylene blocks consist essentially of oxyethylene units or oxypropylene units, preference being given to mixed oxyethylene and oxypropylene units having an oxyethylene proportion of about 30 to 70 percent by weight and an oxypropylene proportion of 70 to 30 percent by weight based on the total content of oxyalkylene units in the block.

In a preferred embodiment the total siloxane block proportion (A) in the copolymer is between 20 and 50 percent by weight, preferably 25% to 40% by weight, and the proportion of the polyoxyalkylene blocks is between 80% and 50% by weight. In a preferred embodiment the block copolymer has an average weight-average molecular weight Mw of at least 10,000 g/mol to about 160,000 g/mol, preferably 15 000 g/mol to about 100,000 g/mol, in particular 20,000 g/mol to about 36,000 g/mol. The determination of the average molecular weights is based on the known methods of GPC analysis using a polystyrene standard.

In a preferred embodiment the molar ratio of α,ω-diacetoxysiloxanes to polyether diols is in the range from 0.90 to 1.10, preferably in the range 0.95 to 1.05, particularly preferably in the range 0.99 to 1.01. It is readily apparent to those skilled in the art that the achievable degree of polymerization depends on achieving a virtually perfect stoichiometry of the reactants.

In a preferred embodiment the process according to the invention is implemented by reacting inventively pretreated acetoxy-Si-containing polyorganosiloxanes of general formula (II)

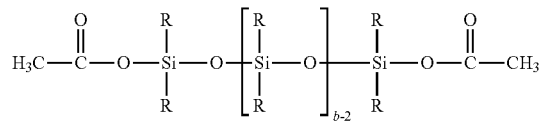

wherein:
R represents methyl radicals,
b represents 8 to 80, preferably 10 to 50, particularly preferably 10 to 25, with at least one alcohol selected from the group of polyether diols of general formula (III)

wherein
R$^1$ represents methyl
n represents 2 to 4,
m represents 0 or 1
x represents a value of 1 to 200, preferably 10 to 100, in particular 35 to 60, wherein the oxyalkylene segments —(C$_n$H$_{(2n-m)}$R$^1_m$O—) within an oxyalkylene ether radical may differ from one another and the sequence of the individual segments —(C$_n$H$_{(2n-m)}$R$^1_m$O—) is freely choosable and comprises in particular block copolymers, random polymers and combinations thereof.

According to the invention, preference is given to polyether diols in which ethylene oxide (EO) and propylene oxide (PO) are present as copolymers. Particular preference is given to EO/PO copolymers having a block-type construction and containing an EO proportion of about 30% to 70% by weight based on the total content of oxyalkylene units.

In order to guarantee increased storage stability, the linear SiOC-linked polyethersiloxanes produced by the process according to the invention can additionally also be admixed with small amounts of organic amines, such as for example N-methylmorpholine, triisopropanolamine or triethanolamine. This corresponds to a preferred embodiment of the invention.

A particularly sensitive and informative assessment of the compounds according to the invention is possible using a performance test in which the obtained copolymer is introduced as a foam stabilizer into polyurethane formulations for producing in particular ether foams or open-celled rigid foams. Structural deficits in the foam stabilizer manifest during foaming as technical inadequacies, for example shrinkage or collapse.

Production of the SiOC-bonded, linear polydimethylsiloxane-polyoxyalkylene block copolymers claimed by the process according to the invention may be carried out with or without use of a suitable solvent as desired. If high molecular weight and thus high-viscosity SiOC-bonded copolymers are sought the production thereof for ease of handling during and after synthesis may advantageously be carried out by reaction of the respective polyether diol with the respective α,ω-acetoxysiloxane in a suitable solvent. Suitable solvents are alkanes, cycloalkanes, alkylaromatics, end-capped polyethers but also emollient esters such as myristyl myristate or the like, high-boiling solvents having boiling points>120° C. being preferred in particular.

The inventors have found that rapid and complete conversion of the pretreated α,ω-diacetoxypolydimethylsiloxanes with polyether diols while avoiding discoloration of the reaction product is especially performed in the presence of ammonia. The use of ammonia both in step (a) (pretreatment) and in step (b) (reaction with polyether diols) corresponds to a very particularly preferred embodiment of the invention.

In a preferred embodiment of the invention the reaction in step (b) (reaction with polyether diols) is performed at temperatures between preferably 20° C. and 70° C. over a duration of preferably 1 to 3 hours.

In another embodiment preferred according to the invention base(s) are initially charged with stirring into the polyetherol or, respectively, polyetherol mixture provided for bonding even before the inventively pretreated α,ω-diacetoxypolydimethylsiloxane is added. In a preferred embodiment of the invention this reaction is performed preferably at temperatures between 50° C. to 90° C. and preferably over a duration of 2 to 6 hours.

It has surprisingly further been found that the polyethersiloxanes produced according to the invention using pretreated α,ω-diacetoxypolydimethylsiloxane have extremely good storage stability. As a criterion for assessing the storage stability of the SiOC-bonded polyethersiloxanes produced in accordance with the inventive teaching, viscosity is monitored as a function of time at a constant storage temperature by sampling since any possible degradation and/or growth processes sensitively manifest therein.

In a preferred embodiment the reaction temperature for producing the copolymers according to the invention should be at 20° C. to 120° C., preferably at 20° C. to 70° C.

EXAMPLES

The examples which follow serve merely to elucidate this invention to those skilled in the art and do not constitute any limitation of the claimed process whatsoever. The inventive determination of the water contents is in principle performed by the Karl Fischer method based on DIN 51777, DGF E-III 10 and DGF C-III 13a. $^{29}$Si-NMR spectroscopy was used for reaction monitoring in all examples.

In the context of the present invention the $^{29}$Si-NMR samples are analysed at a measurement frequency of 79.49 MHz in a Bruker Avance III spectrometer equipped with a 287430 sample head with gap width of 10 mm, dissolved at 22° C. in CDCl$_3$ and against a tetramethylsilane (TMS) external standard [δ($^{29}$Si)=0.0 ppm].

The gas chromatograms are recorded on an Agilent Technologies GC 7890B GC instrument fitted with an HP-1 column having dimensions of 30 m×0.32 mm ID×0.25 μm dF (Agilent Technologies No. 19091Z-413E) using hydrogen as a carrier gas and employing the following parameters:

Detector: FID; 310° C.
Injector: split; 290° C.
Mode: constant flow, 2 ml/min
Temperature programme: 60° C. at 8° C./min-150° C. at 40° C./min-300° C. 10 min.

Employed as an indicator for reaching the equilibrium is the total cycles content determined by gas chromatography and defined as the sum of the $D_4$, $D_5$, $D_6$ contents based on the siloxane matrix and ascertained after derivatization of the α,ω-diacetoxypolydimethylsiloxanes to the corresponding α,ω-diisopropoxypolydimethylsiloxanes. The derivatization to afford the α,ω-diisopropoxypolydimethylsiloxanes is intentionally chosen in order to prevent a thermally induced retrocleavage reaction of the α,ω-diacetoxypolydimethylsiloxanes which may take place under the conditions of analysis by gas chromatography (regarding the retrocleavage reaction see inter alia J. Pola et al., Collect. Czech. Chem. Commun. 1974, 39(5), 1169-1176 and also W. Simmler, Houben-Weyl, Methods of Organic Chemistry, Vol. VI/2, 4th Edition, 0-Metal Derivates of Organic Hydroxy Compounds p. 162 ff.).

The employed polyether diols have water contents of about 0.2% by mass and are used after pre-drying thereof. Employed toluene and alkylbenzene ($C_{10}$-$C_{13}$) each have a water content of 0.03% by mass and are used without pre-drying.

The OH number of the polyether diols is determined according to DGF C-V 17 a (53) or according to Ph. Eur. 2.5.3 Method A, wherein the hydroxyl groups of the sample to be analysed are firstly acetylated with acetic anhydride in the presence of pyridine and then within the scope of a differential titration (blank sample, accounting for acetic anhydride excess) the liberated acetic acid is titrated as the consumption of KOH in mg per gram of polyether diol.

Example 1

Production of an End-Equilibrated, Acetoxy-Terminated, Linear Polydimethylsiloxane In a 1000 ml four-necked flask fitted with a KPG stirrer, an internal thermometer and a reflux cooler 77.3 g (0.757 mol) of acetic anhydride together with 732.8 g (1.98 mol) of decamethylcyclopentasiloxane ($D_5$) and 24.3 g of acetic acid (3.0 percent by weight based on the total mass of the reactants) are initially charged with stirring and admixed with 1.62 g (0.88 ml) of trifluoromethanesulfonic acid (0.2 percent by mass based on the total batch) and swiftly heated to 150° C. The initially slightly cloudy reaction mixture is left at this temperature for 4 hours with continued stirring.

After cooling of the batch a colorless, clear, mobile liquid is isolated, whose $^{29}$Si-NMR spectrum demonstrates the presence of Si-acetoxy groups in a yield of about 93% based on employed acetic anhydride corresponding to an α,ω-diacetoxypolydimethylsiloxane having an average total chain length of about 14.

Conversion of the α,ω-Diacetoxypolydimethylsiloxane into the Corresponding α,ω-Diisopropoxypolydimethylsiloxane for Analytical Characterization Immediately after the synthesis in a 250 ml four-necked round-bottomed flask fitted with a KPG stirrer, an internal thermometer and a reflux cooler 50.0 g of this trifluoromethanesulfonic acid-acidified, equilibrated α,ω-diacetoxypolydimethylsiloxane are mixed together with 11.3 g of a molecular sieve-dried isopropanol by stirring at 22° C. Gaseous ammonia ($NH_3$) is then introduced to the reaction mixture until alkaline reaction (moist universal indicator paper) and the mixture is then stirred at this temperature for a further 45 minutes. The precipitated salts are removed using a fluted filter.

A colorless, clear liquid is isolated, whose accompanying $^{29}$Si-NMR spectrum demonstrates the quantitative conversion of the α,ω-diacetoxypolydimethylsiloxane into an α,ω-diisopropoxypolydimethylsiloxane.

An aliquot of this α,ω-diisopropoxypolydimethylsiloxane is withdrawn and analysed by gas chromatography. The gas chromatogram shows the following contents (reported in percent by mass):

| $D_4$ | $D_5$ | $D_6$ | Sum of ($D_4$-$D_6$) | Isopropanol content |
|---|---|---|---|---|
| 4.09% | 2.62% | 0.86% | 7.57% | 4.60% |

Example 2 (Inventive)

a) Pretreatment of the Trifluoromethanesulfonic Acid-Acidified, End-Equilibrated α,ω-Diacetoxypolydimethylsiloxane In a 250 ml four-necked flask fitted with a KPG stirrer, a contact thermometer and a gas introduction tube 100 g of the trifluoromethanesulfonic acid-acidified, end-equilibrated, acetoxy-terminated, linear polydimethylsiloxane produced in example 1 are subjected to a moderate ammonia stream at 22° C. for 30 minutes with stirring and a salt precipitation is observed. Once gas introduction is complete and the stirrer is switched off a sample of the clear supernatant is withdrawn and characterized using $^{29}$Si-NMR analysis. The integral intensity over the signal layers characteristic for short-chain α,ω-diacetoxysiloxanes have markedly reduced compared to the $^{29}$Si-NMR spectrum of the non-pretreated, end-equilibrated, acetoxy-terminated, linear polydimethylsiloxane and altogether represent only about 27% of the Si-bonded acetoxy groups originally appearing in this shift range in the starting spectrum. Calculating the average chain length based on the integral intensities of the new spectrum results in a length of about N=15. A pleated filter is used to separate the mixture from the precipitated salts and the α,ω-diacetoxypolydimethylsiloxane is isolated.

b) Reacting the α,ω-Diacetoxypolydimethylsiloxane Resulting from a) with Polyether Diol in the Presence of Ammonia as the Base In a 250 ml four-necked flask fitted with a KPG stirrer, a contact thermometer and a water separator 56.1 g (0.02 mol) of a polyether diol constructed from ethylene oxide and propylene oxide units and having an average molar mass of about 2800 g/mol and a propylene oxide proportion of 40 percent by mass are admixed with 91.3 g of toluene and subjected to azeotropic drying at 120° C. After cooling 35.2 g (0.029 mol) of the α,ω-diacetoxypolydimethylsiloxane from step a) are added and then a moderate stream of dry ammonia is introduced at 22° C. over 3 hours with stirring. The resulting salts are subsequently separated using a filter press. The obtained clear filtrate is concentrated to about 75% of its original volume in a rotary evaporator at a bottom temperature of 150° C. and an applied auxiliary vacuum of <1 mbar and then mixed with 91.3 g of a butanol-started polyetherol consisting solely of propyleneoxy units having an average molar mass of 700 g/mol before distillation under the previously chosen conditions is continued until volatiles no longer pass over. Cooling affords a clear, colorless, high viscosity material whose $^{29}$Si-NMR spectrum verifies quantitative conversion.

The invention claimed is:

1. A process for producing SiOC-bonded, linear polydimethylsiloxane-polyoxyalkylene block copolymers comprising repeating (AB) units, comprising the steps of:
    (a) pretreating acidified end-equilibrated α,ω-diacetoxypolydimethylsiloxanes with a base with optional subsequent distillative purification of the α,ω-diacetoxypolydimethylsiloxanes previously treated with base
    (b) reacting the α,ω-diacetoxypolydimethylsiloxanes resulting from (a) with polyether diols in the presence of a solid, liquid or gaseous base, optionally using inert solvents.

2. The process according to claim 1, wherein the molar ratio of α,ω-diacetoxypolydimethylsiloxanes to polyether diols is in the range from 0.90 to 1.10.

3. The process according to claim 1, wherein the reaction of the α,ω-diacetoxypolydimethylsiloxanes with the polyether diols in step (b) is performed at temperatures of from 20° C. to 120° C.

4. The process according to claim 1, wherein the base to be employed comprises ammonia.

5. The process according to claim 1, wherein the pretreatment of the acidified end-equilibrated α,ω-diacetoxypolydimethylsiloxane in step (a) is performed with base, in the temperature range from 0° C. to 50° C.

6. The process according to claim 1, wherein the minimum molar amount of the employed base is chosen such that it corresponds to 1/20 to 1/8 of the molar amount of Si-bonded acetoxy groups in the α,ω-diacetoxypolydimethylsiloxane.

7. The process according to claim 1, wherein the inert solvents are alkanes, cycloalkanes, alkylaromatics, end-capped polyethers and/or emollient esters, wherein the emollient esters are myristyl myristate or esters derived from lauric acid, myristic acid, palmitic acid, stearic acid, oleic acid, isostearic acid, ricinoleic acid and/or behenic acid combined with cetyl, stearyl, isostearyl, oleyl, octyldodecyl, myristyl and/or behenyl alcohol and/or glycerol.

8. The process according to claim 1, wherein the weight-average molecular weight of each siloxane block (A), $(-(CH_3)_2SiO-)_b$, is between 600 to 6100 g/mol.

9. The process according to claim 1, wherein the polyoxyalkylene block (B), $(-C_nH_{(2n-1)}R^1_mO-)_c$, wherein $R^1$ represents methyl, contains mixed oxyethylene and oxypropylene units having an oxyethylene proportion of from 30 to 70 percent by weight and an oxypropylene proportion of from 70 to 30 percent by weight based on the total content of oxyalkylene units in the block.

10. The process according to claim 1, wherein the weight-average molecular weight of each polyoxyalkylene block (B), $(C_nH_{(2n-1)}R^1_mO)_c$, wherein $R^1$ represents methyl, is between 600 and 10,000 g/mol.

11. The process according to claim 1, wherein the proportion of the siloxane blocks A in the total copolymer is between 20 and 50 percent by weight.

12. The process according to claim 1, wherein the polydimethylsiloxane-polyoxyalkylene block copolymer has a weight-average molecular weight of from 10,000 g/mol to 200,000 g/mol.

13. The process according to claim 1, wherein the molar ratio of α,ω-diacetoxypolydimethylsiloxanes to polyether diols is in the range from 0.95 to 1.05.

14. The process according to claim 1, wherein the reaction of the α,ω-diacetoxypolydimethylsiloxanes with the polyether diols in step (b) is performed at temperatures of from 20° C. to 70° C.

15. The process according to claim 1, comprising the step of
   (a) pretreating trifluoromethanesulfonic acid-acidified end-equilibrated α,ω-diacetoxypolydimethylsiloxanes with a base with optional subsequent distillative purification of the α,ω-diacetoxypolydimethylsiloxanes previously treated with base.

16. The process according to claim 1, comprising the step of
   (a) pretreating superacid-acidified end-equilibrated α,ω-diacetoxypolydimethylsiloxanes with a base with optional subsequent distillative purification of the α,ω-diacetoxypolydimethylsiloxanes previously treated with base.

17. The process according to claim 1, wherein the proportion of the siloxane blocks A in the total copolymer is between 25 and 40 percent by weight.

18. The process according to claim 1, wherein the polydimethylsiloxane-polyoxyalkylene block copolymer has a weight-average molecular weight of from 25,000 g/mol to 180,000 g/mol.

* * * * *